United States Patent
Wilson

(10) Patent No.: US 9,146,843 B2
(45) Date of Patent: Sep. 29, 2015

(54) RECORDING EXECUTION INFORMATION

(75) Inventor: Russell Wilson, Aberdeenshire (GB)

(73) Assignee: International Business Machines Corporation, Armonk, NY (US)

( * ) Notice: Subject to any disclaimer, the term of this patent is extended or adjusted under 35 U.S.C. 154(b) by 2401 days.

(21) Appl. No.: 11/968,913

(22) Filed: Jan. 3, 2008

(65) Prior Publication Data

US 2008/0168472 A1    Jul. 10, 2008

(30) Foreign Application Priority Data

Jan. 5, 2007    (EP) .................................... 07100156

(51) Int. Cl.
G06F 3/00 (2006.01)
G06F 9/44 (2006.01)
G06F 9/46 (2006.01)
G06F 13/00 (2006.01)
G06F 11/36 (2006.01)
G06F 11/34 (2006.01)
G06F 9/54 (2006.01)

(52) U.S. Cl.
CPC ........ G06F 11/3688 (2013.01); G06F 11/3466 (2013.01); *G06F 9/546* (2013.01)

(58) Field of Classification Search
CPC .. G06F 11/3688; G06F 9/546; G06F 11/3466
See application file for complete search history.

(56) References Cited

U.S. PATENT DOCUMENTS

| 5,802,272 A | 9/1998 | Sites et al. |
| 6,047,390 A | 4/2000 | Butt et al. |
| 6,158,049 A | 12/2000 | Goodwin et al. |
| 6,633,968 B2 * | 10/2003 | Zwiegincew et al. .......... 711/213 |
| 7,685,573 B2 * | 3/2010 | Kang et al. ..................... 717/128 |

FOREIGN PATENT DOCUMENTS

WO    WO0046678    8/2000

OTHER PUBLICATIONS

Zoltán Balaton, Péter Kacsuk and Norbert Podhorszki; Application monitoring in the grid with GRM and PROVE; May 2001; 10 pages.*
Norbert Podhorszki and Peter Kacsuk; Design and Implementation of a Distributed Monitor for Semi-On-Line Monitoring of VisualMP Applications; 10 pages; 2000.*

* cited by examiner

*Primary Examiner* — H S Sough
*Assistant Examiner* — Kimberly Jordan
(74) *Attorney, Agent, or Firm* — Winstead, P.C.

(57) ABSTRACT

A method for recording execution information for a software application executable in a computer system, the computer system including a message queue, the method comprising the steps of: generating the execution information by the software application; and recording the execution information to the message queue for subsequent retrieval, wherein the message queue is accessible by the software application and persistent with respect to the software application.

25 Claims, 4 Drawing Sheets

RECORDING EXECUTION INFORMATION

FIELD OF THE INVENTION

The present invention relates to recording execution information for a software application. In particular it relates to recording execution information in a message queue which is persistent with respect to the software application.

BACKGROUND

Software applications at runtime can generate and record execution information for a number of purposes. For example, execution trace information, execution logs, data dumps and debug information can be generated to assist in problem determination in the event that a software application fails. However, recording such execution information routinely during the execution of a software application is burdensome and imposes a further resource requirement over and above that of the software application itself, manifesting as a requirement for further storage and processing throughput. In some environments, the burden of generating and recording execution information at execution time can be so great that it exceeds the resource requirements of the software application itself. For this reason, a decision to include facilities for the generation and recording of execution information in a software application will involve a compromise. The balance is between a resource-efficient, high performance software application and a rich set of execution information for use in, for example, problem determination. However this balance is struck for a particular software application, one of performance and reliability may be compromised.

Execution information, once generated by a software application, can be recorded in a memory associated with the software application, such as a high-speed volatile memory device. Using such memory can alleviate the effect of generating and recording execution information since read and write operations to such memory can be made quickly. However, the use of such fast volatile memory has the disadvantage that the execution information recorded in the memory is lost in the event that the software application fails. To overcome this disadvantage, a software application can record execution information to a non-volatile storage device, such as a disk storage device. However, read and write operations to such storage devices are generally much slower than those to a high-speed memory, and overall application performance can be impacted negatively.

It would therefore be advantageous to provide for the persistence of execution information generated by a software application without placing additional burdens on the software application to undertake the regular recording of such information to a non-volatile storage medium. Further, it would be advantageous to process execution information without placing additional burdens on the software application to undertake such processing.

SUMMARY

The present invention accordingly provides, in a first aspect, a method for recording execution information for a software application executable in a computer system, the computer system including a message queue, the method comprising the steps of: generating the execution information by the software application; and recording the execution information to the message queue for subsequent retrieval, wherein the message queue is accessible by the software application and persistent with respect to the software application.

Thus the execution information is stored in a message queue which is persistent with respect to the software application. In this way, the execution information is stored such that it will persist beyond the end of execution of the software application. For example, if the software application fails during execution, the execution information will not be lost while it may not have been specifically recorded to a non-volatile storage device such as a disk. Thus, the relative persistence of the execution information in the message queue is achieved without placing additional burdens on the software application to undertake regular recording of the execution information to a non-volatile storage medium.

Preferably, the method further comprises the step of reading by the software application of the execution information from the message queue for processing.

Preferably, the software application reads the execution information from the message queue for processing at startup of the software application.

Alternatively, preferably the software application is executable as a software application process in the computer system.

Preferably, the computer system further includes an executable execution information handler, wherein the message queue is accessible by the execution information handler such that the execution information handler is operable to read the execution information from the message queue for processing.

Preferably, the software application process is multi-threaded and the execution information handler is executable as a thread of the software application such that the execution information handler is executable substantially in parallel with one or more other threads in the software application process.

Preferably, the execution information is trace information for the software application.

Preferably, the execution information handler is executable as a process in the computer system separate to the software application process such that the execution information handler is executable substantially in parallel with the software application process.

Thus, in this way the execution information can be processed without placing additional burdens on the software application to undertake such processing.

Preferably, the execution information is trace information for the software application.

Preferably, the processing includes one or more of: storing, outputting or deleting the execution information in the message queue.

The present invention accordingly provides, in a second aspect, a recording system for recording execution information for a software application executable in a computer system, the computer system including a message queue, the recording system comprising: a generator for the software application to generate the execution information; and a recorder for recording the execution information in the message queue for subsequent retrieval, wherein the message queue is accessible by the software application and persistent with respect to the software application.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the regression manager apparatus described above.

The present invention accordingly provides, in a fourth aspect, a computer program element comprising computer program code to, when loaded into a computer system and executed thereon, cause the computer to perform the steps of a method as described above.

BRIEF DESCRIPTION OF THE DRAWINGS

A preferred embodiment of the present invention is described below in detail, by way of example only, with reference to the accompanying drawings, in which.

DETAILED DESCRIPTION

Figure 1:
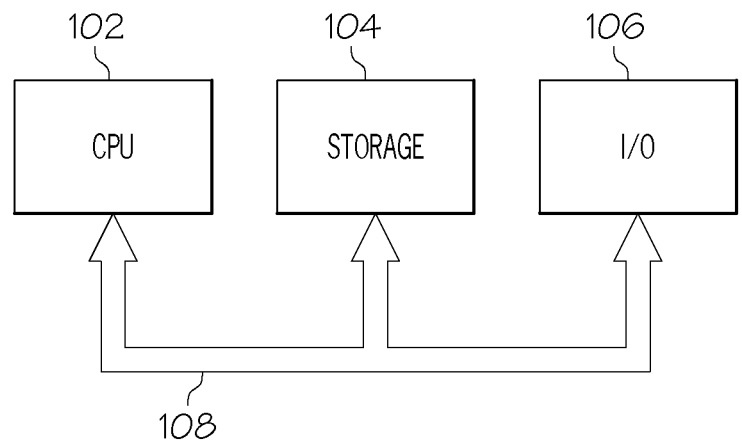
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. Examples of non-volatile storage devices include disk or tape storage devices. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
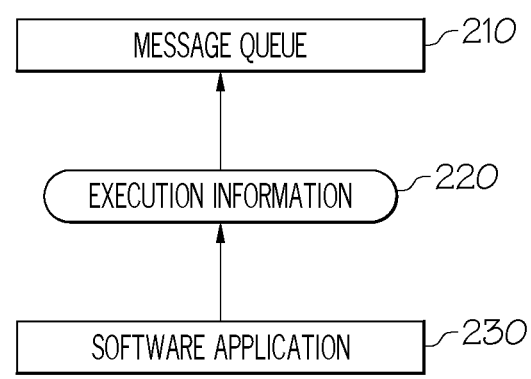
FIG. 2 is a block diagram of an arrangement for a software application to record execution information to a message queue in accordance with a preferred embodiment of the present invention.

FIG. 2 is a block diagram of an arrangement for a software application 230 to record execution information 220 to a message queue 210 in accordance with a preferred embodiment of the present invention. FIG. 2 includes a software application 230 which is an executable software component include instructions for executing on a computer system. Software application 230 would be stored, for example, in a storage of a computer system such as a memory, and would execute, for example, with an operating system of a computer system. In a preferred embodiment, the software application 230 is a executable process in execution on a computer system. The software application 230 is operable to generate execution information 220. Execution information 220 can include execution trace information, execution logs, data dumps or debug information, such as is required to assist with problem determination in the event of a problem with the software application 230. Alternatively, the execution information 220 can include any information output by the software application 230 which is required to be recorded.

The Software application 230 records the execution information 220 to a message queue 210. Message queue 210 is a data structure independent of, and accessible to, the software application 230 for recording message data items and is persistent with respect to the software application 230. The persistence of the message queue 210 with respect to the software application 230 provides that the message queue 210 will persist intact beyond a cessation of the execution of the software application 230.

The message queue 210 is logically separated from the software application 230 such that the message queue 210 does not form part of the software application 230 and the software application 230 does not form part of the message queue 210. For example, the message queue 210 is a message queue facility provided by an operating system with which the software application executes. Such message queues in operating systems are well known in the art and can include message queues in shared memory for providing inter-process communication. To provide for access to the message queue 210 by the software application 230, the software application 230 can include a reference to the message queue 210. An example of such a reference is a memory pointer, or alternatively an access interface function such as an application programming interface (API) function. Further, the message queue 210 can be generated at the request of the software application 230, such as by calling an operating system API function.

Figure 3:
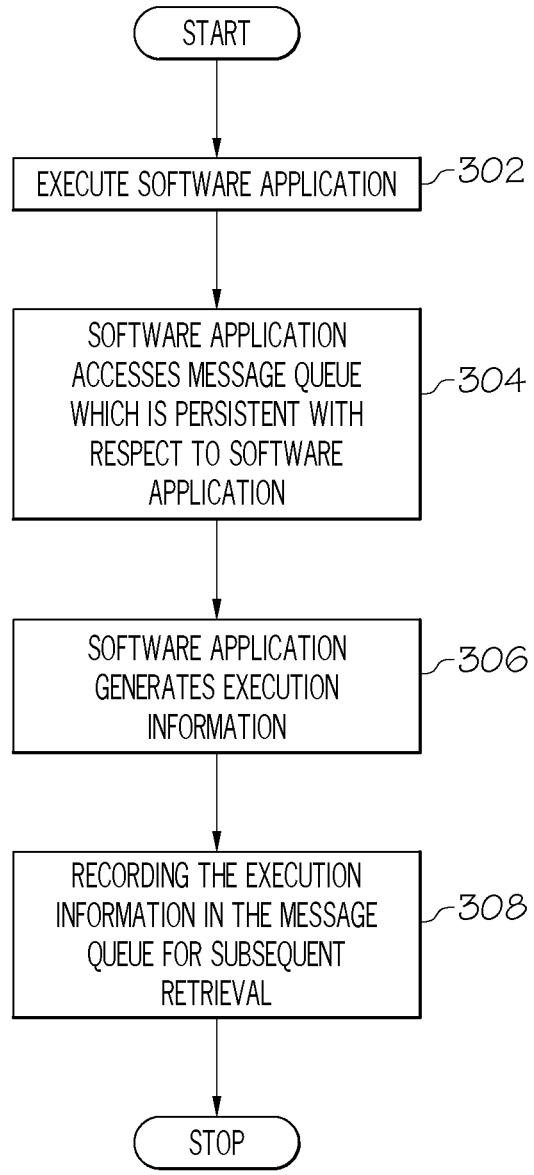
FIG. 3 is a flowchart illustrating a method in a preferred embodiment of the present invention.

The method of FIG. 3 is illustrative of a preferred embodiment of the present invention in use. Initially, at step 302, the software application 230 commences execution. At step 304 the software application 230 accesses the message queue 210 which is persistent with respect to the software application 230. Alternatively, in the event that the message queue 210 does not exist when the application starts, the software application 230 can request that a new message queue 210 is created. Such a request can be made, for example, by way of an operating system API function. Subsequently, at step 306, the software application 230 generates execution information 220 such as trace or log information. At step 308 the execution information 220 is recorded in the message queue 210 for subsequent retrieval. The recording of the execution information 220 in the message queue 210 can be achieved, for example, by using a operating system API which is operable to accept an argument for storage in the message queue 210. In one embodiment, it is necessary to convert a format of the execution information 220 to a predefined message format suitable for storage in the message queue 210. Such conversion may be facilitated by an operating system API function or alternatively by the software application 230 itself.

Thus the execution information 220 is stored in a message queue 210 which is independent of, and persistent with respect to, the software application 230. In this way, the execution information 220 is stored such that it will persist beyond the end of execution of the software application 230. For example, if the software application 230 fails during execution, the execution information 220 will not be lost while it may not have been specifically recorded to a non-volatile storage device such as a disk. Thus, the relative persistence of the execution information 220 in the message queue 210 is achieved without placing additional burdens on the software application 230 to undertake regular recording of the execution information to a non-volatile storage medium.

Once recorded in the message queue 210, the execution information 220 can be retrieved for processing by an execution information handler. An execution information handler may be a software component operable to retrieve and process execution information 220. Such processing can include, for example: storing execution information 220 to a non-volatile storage device such as a disk storage device; outputting execution information 220 to a user, such as during problem determination; transmitting execution information 220 to another entity such as an external computer system or a separate software application; and deleting the recorded execution information 220 from the message queue 210. The execution information handler can be included in the software application 230. However, the recording of the execution information 220 in the message queue 210 provides that the execution information handler can alternatively be provided in a separate software application to which the message queue 210 is accessible. In this way execution information 220 can be processed without placing additional burdens on the software application 230 to undertake such processing. Such an arrangement is illustrated below with respect to FIG. 5.

Figure 4:
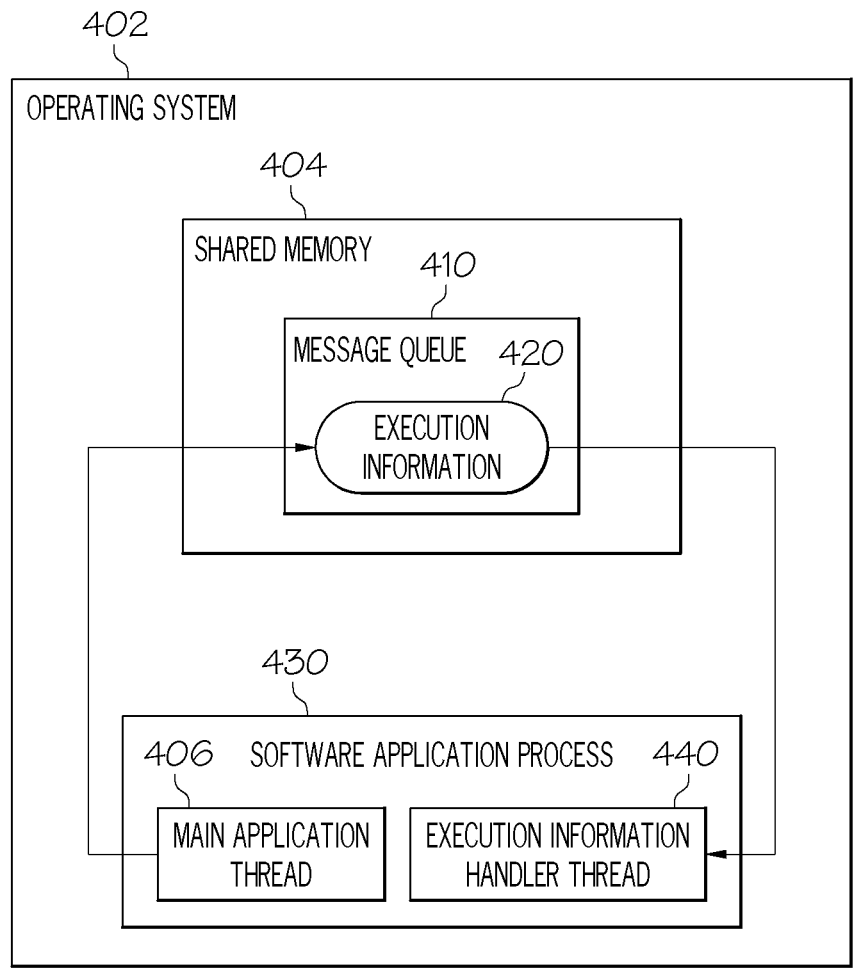
FIG. 4 is a block diagram illustrating a first exemplary arrangement for a software application to record execution information to a message queue in accordance with a preferred embodiment of the present invention.

FIG. 4 is a block diagram illustrating a first exemplary arrangement for a software application 430 to record execution information 420 to a message queue 410 in accordance with a preferred embodiment of the present invention. FIG. 4 includes an operating system 402 which is a software component for managing hardware and software resources in a computer system. The operating system 402 provides a shared memory area 404 which includes a message queue 410. The message queue 410 is substantially the same as that described above with respect to 210. Executing with the operating system is a software application process 430. The software application process 430 is a multithreaded process executing with the operating system 402. As will be apparent to those skilled in the art, a multithreaded process can include multiple threads of executable instructions which can execute substantially in parallel. Further, whilst the software application process 430 is illustrated as being comprised within the operating system 402, it will be apparent to those skilled in the art that the software application process 430 could alternatively be provided separately to the operating system 402 and executing with the operating system 402 on a computer system.

The software application process 430 includes a main application thread 406 and an execution information handler thread 440. The main application thread 406 is a thread of execution of software instructions for a software application and is operable to generate execution information 420 during execution and record the execution information 420 in the message queue 410. The execution information 420 is substantially the same as that described above with respect to FIG. 2. The execution information handler thread 440 is a thread of execution of software instructions which is operable to retrieve execution information 420 from the message queue 410 and process the execution information 420. The particular processing undertaken by the execution information handler thread 440 is immaterial to the present description and can include the examples described above with respect to FIGS. 2 and 3. The main application thread 406 and the execution information handler thread 440 are executable substantially in parallel.

Thus the arrangement of FIG. 4 provides for a software application embodied in the main application thread 406 of the software application process 430 to generate execution information 420 for storage to the message queue 410 which is persistent with respect to the software application process 430. The message queue 410 is persistent in this respect since it is provided by the operating system 402 and is independent of the software application process 430. In this way the execution information 420 is stored such that it will persist beyond the end of execution of the software application 430.

Figure 5:
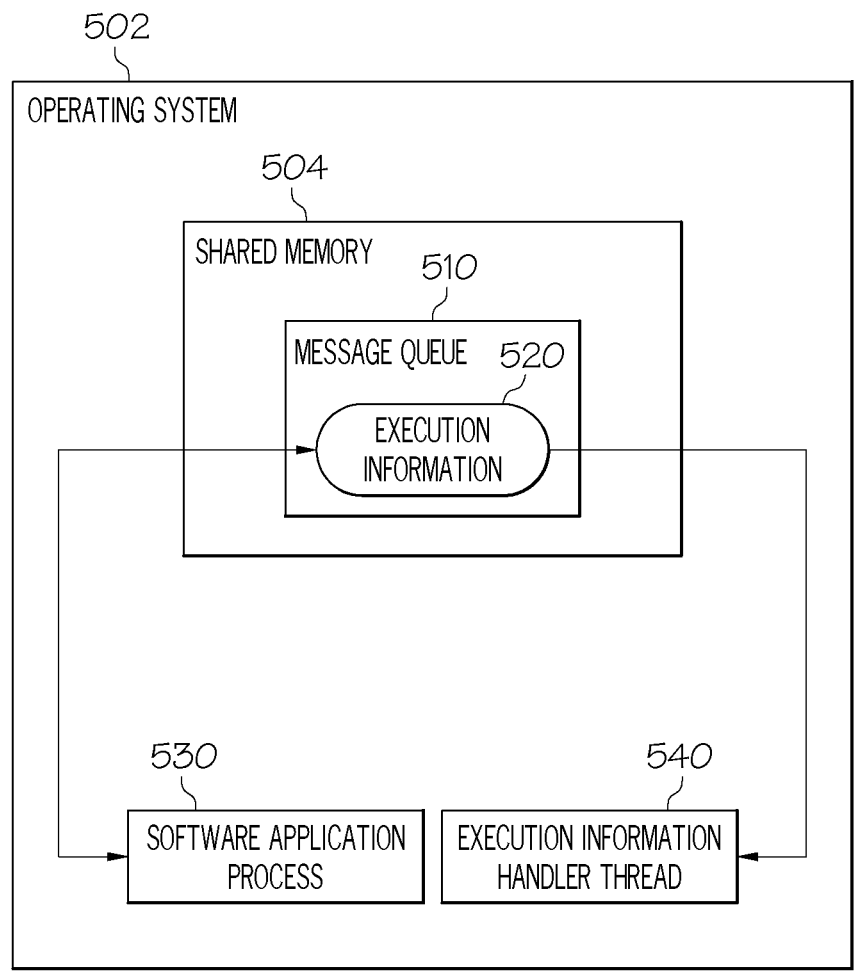
FIG. 5 is a block diagram illustrating a second exemplary arrangement for a software application to record execution information to a message queue in accordance with a preferred embodiment of the present invention.

FIG. 5 is a block diagram illustrating a second exemplary arrangement for a software application 530 to record execution information 540 to a message queue 510 in accordance with a preferred embodiment of the present invention. Many of the elements of FIG. 5 are identical to those described above with respect to FIG. 4 and these will not be repeated here. In FIG. 5, the software application process 530 does not include an execution information handler thread 440. Instead, a separate execution handler process 540 is provided to retrieve execution information 520 from the message queue 510 for processing. This is possible because the message queue 510 is stored in the shared memory 504 of the operating system 502 which can be available to all processes executing with the operating system 502. Thus, in use, the software application process 530 generates execution information 520 and records the execution information 520 to the message queue 510. The execution information handler process 540 is operable to retrieve the execution information 520 for processing. In this way the execution information 420 is stored such that it will persist beyond the end of execution of the software application 430. Further, the execution information handler process 540 is completely independent of the software application process 530 and so the processing of the execution information 520 does not burden the software application process 530. This can be particularly advantageous in a multiprocessor or distributed environment where the execution information handler process 540 can execute in one resource (such as on a first processor) while the software application process 530 executes in another resource (such as on a second processor).

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A method for recording execution information for a software application executable in a computer system, the computer system including a message queue, the method comprising the steps of: generating the execution information by the software application; and recording the execution information to the message queue for subsequent retrieval, wherein the message queue is accessible by the software application and persistent with respect to the software application.

2. The method of claim 1, further comprising the step of reading by the software application of the execution information from the message queue for processing.

3. The method of claim 2, wherein the software application reads the execution information from the message queue for processing at startup of the software application.

4. The method of claim 1, wherein the software application is executable as a software application process in the computer system.

5. The method of claim 4, wherein the computer system further includes an executable execution information handler, wherein the message queue is accessible by the execution information handler such that the execution information handler is operable to read the execution information from the message queue for processing.

6. The method of claim 5, wherein the software application process is multithreaded and the execution information handler is executable as a thread of the software application such that the execution information handler is executable substantially in parallel with one or more other threads in the software application process.

7. The method of claim 6, wherein the execution information is trace information for the software application.

8. The method of claim 5, wherein the execution information handler is executable as a process in the computer system separate to the software application process such that the execution information handler is executable substantially in parallel with the software application process.

9. The method of claim 8, wherein the execution information is trace information for the software application.

10. The method of claim 8, wherein the processing includes one or more of: storing, outputting, or deleting the execution information in the message queue.

11. A computer system for recording execution information for a software application executable in the computer system, the computer system including a processor connected to a memory, wherein the memory comprises a message queue, the computer system comprising: a generator for the software application to generate the execution information; and a recorder for recording the execution information in the message queue for subsequent retrieval, wherein the message queue is accessible by the software application and persistent with respect to the software application.

12. The system of claim 11, further comprising a reader for the software application to read the execution information from the message queue for processing.

13. The system of claim 12, wherein the software application reads the execution information from the message queue for processing at startup of the software application.

14. The system of claim 11, wherein the software application is executable as a software application process in the computer system.

15. The system of claim 14, wherein the computer system further includes an executable execution information handler, wherein the message queue is accessible by the execution information handler such that the execution information handler is operable to read the execution information from the message queue for processing.

16. The system of claim 15, wherein the software application process is multithreaded and the execution information handler is executable as a thread of the software application such that the execution information handler is executable substantially in parallel with one or more other threads in the software application process.

17. The system of claim 16, wherein the execution information is trace information for the software application.

18. The system of claim 15, wherein the execution information handler is executable as a process in the computer system separate to the software application process such that the execution information handler is executable substantially in parallel with the software application process.

19. The system of claim 18, wherein the execution information is trace information for the software application.

20. The system of claim 18, wherein the processing includes one or more of: storing, outputting or deleting the execution information in the message queue.

21. A computer program product embodied in a computer readable storage medium for recording execution information in a message queue, the computer program product comprising the programming instructions for:
    generating the execution information by a software application; and
    recording the execution information to the message queue for subsequent retrieval, wherein the message queue is accessible by the software application and persistent with respect to the software application.

22. The computer program product as recited in claim 21 further comprising the programming instructions for:
    reading by the software application of the execution information from the message queue for processing.

23. The computer program product as recited in claim 22, wherein the software application reads the execution information from the message queue for processing at startup of the software application.

24. The computer program product as recited in claim 21, wherein the message queue is accessible by an execution information handler such that the execution information handler is operable to read the execution information from the message queue for processing.

25. The computer program product as recited in claim 24, wherein the software application is executable as a software application process, wherein the execution information handler is executable as a process separate to the software application process such that the execution information handler is executable substantially in parallel with the software application process.

* * * * *